United States Patent
Stanforth et al.

(10) Patent No.: US 8,233,928 B2
(45) Date of Patent: Jul. 31, 2012

(54) SYSTEM AND METHOD FOR MANAGING SPECTRUM ALLOCATION

(75) Inventors: Peter Stanforth, Winter Springs, FL (US); Mario A. Camchong, Oviedo, FL (US); Santosh Hari, Lake Mary, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 515 days.

(21) Appl. No.: 12/569,073

(22) Filed: Sep. 29, 2009

(65) Prior Publication Data

US 2011/0077042 A1 Mar. 31, 2011

(51) Int. Cl.
*H04B 7/00* (2006.01)

(52) U.S. Cl. ......... 455/509; 455/450; 455/512; 370/329

(58) Field of Classification Search .................. 455/450, 455/509, 512; 370/329
See application file for complete search history.

(56) References Cited

U.S. PATENT DOCUMENTS

| | | | |
|---|---|---|---|
| 5,608,727 A | 3/1997 | Perreault et al. | |
| 5,729,531 A | 3/1998 | Raith et al. | |
| 7,349,880 B1 | 3/2008 | Kitao | |
| 7,460,837 B2 | 12/2008 | Diener | |
| 2002/0019965 A1 | 2/2002 | Bims et al. | |
| 2003/0032399 A1 | 2/2003 | Slupe | |
| 2004/0087310 A1 | 5/2004 | Williamson et al. | |
| 2006/0083205 A1 | 4/2006 | Buddhikot et al. | |
| 2006/0143111 A1 | 6/2006 | Mylet | |
| 2006/0218392 A1 | 9/2006 | Johnston | |
| 2006/0262768 A1 | 11/2006 | Putzolu | |
| 2007/0106596 A1 | 5/2007 | Bayyapu et al. | |
| 2007/0274404 A1 | 11/2007 | Papandriopoulos et al. | |
| 2008/0052387 A1 | 2/2008 | Heinz et al. | |
| 2008/0108365 A1 | 5/2008 | Buddhikot et al. | |
| 2008/0151743 A1 | 6/2008 | Tong et al. | |
| 2008/0183634 A1 | 7/2008 | Sadler | |
| 2008/0186882 A1 | 8/2008 | Scherzer et al. | |
| 2008/0221951 A1 | 9/2008 | Stanforth et al. | |
| 2008/0222019 A1 | 9/2008 | Stanforth et al. | |
| 2008/0222021 A1 * | 9/2008 | Stanforth et al. | 705/37 |
| 2009/0017761 A1 | 1/2009 | Li et al. | |
| 2009/0046625 A1 | 2/2009 | Diener et al. | |
| 2009/0197627 A1 | 8/2009 | Kuffner et al. | |
| 2010/0330919 A1 * | 12/2010 | Gurney et al. | 455/67.11 |

OTHER PUBLICATIONS

International Search Report and Written Opinion from corresponding International Application No. PCT/US10/47089.

Kwerel, Evan et al., "A Proposal for a Rapid Transition to Market Allocation of Spectrum", Federal Communications Commission, 2002, OPP Working Paper No. 38, pp. 1-50.

By the Commission, "Second Report and Order, Order on Reconsideration, and Second Further Notice of Proposed Rulemaking", Federal Communications Commission, 2004, FCC 04-167, pp. 1-180.

(Continued)

*Primary Examiner* — Raymond Dean

(74) *Attorney, Agent, or Firm* — Renner, Otto, Boisselle & Sklar, LLP

(57) ABSTRACT

Disclosed are techniques for managing situations where spectrum use by one party is preempted by spectrum needs of another party. A revocation may be sent from a spectrum management system to secondary radio systems that are impacted by the presence of priority radio system. Remedial action may be taken if an acknowledgement of the revocation message is not received from a secondary radio system. Also, the secondary radio systems may transmit keep-alive messages to monitor operation of the communication pathway for the revocation messages.

20 Claims, 5 Drawing Sheets

OTHER PUBLICATIONS

McKnight, Lee et al., "Best Effort versus Spectrum Markets: Wideband and Wi-Fi versus 3G MVNOs?", pp. 1-18.
Prabhu, Krish et al., "Time for Action" Genuine Ideas, 2002, [retrieved online Feb. 1, 2008], <http://www.genuineideas.com/ArticlesIndex/TimeForAction.htm>.
U.S. Spectrum Management Policy: Agenda for the Future, 1991.
Radio Spectrum Management, Module 5 of ICT Regulation Toolkit, ITU, 2007.
Jones, Steven K. et al., "Initial Evaluation of the Performance of Prototype TV-Band White Space Devices", (2007), OET Report, FCC/OET 07-TR-1006.
47 C.F.R. 15.713.
FCC 08-260, Second Report and Order and Memorandum Opinion and Order, Adopted Nov. 4, 2008 and Released Nov. 14, 2008.
"Digital Dividend: Cognitive Access, Consultation on License-Exempting Cognitive Devices using Interleaved Spectrum", Ofcom, Publication Date: Feb. 16, 2009.

* cited by examiner

SYSTEM AND METHOD FOR MANAGING SPECTRUM ALLOCATION

TECHNICAL FIELD OF THE INVENTION

The technology of the present disclosure relates generally to wireless communications infrastructure and, more particularly, to a system and method for managing spectrum allocation for spectrum that is used to support wireless communications.

BACKGROUND

Wireless networks and systems are becoming increasingly popular. But wireless communications are constrained due to a lack of available, interference free spectrum that may be used for reliable communications within a geographic area.

To enhance the availability and reliability of interference free spectrum, procedures that are governed by regulatory agencies (e.g., the Federal Communications Commission (FCC) in the United States) have been developed for allocating and governing spectrum use. In the U.S., for example, the FCC licenses spectrum in a primary spectrum market to Commission licensees. A secondary market exists for the Commission licensees to sublease spectrum for use by other parties.

In the U.S., some spectrum may be used without a license, but regulations on the spectrum may be imposed. For example, analog television (TV) broadcasts have been eliminated in favor of digital TV broadcasts. This frees spectrum channels for use by unlicensed radio systems to offer various services, such as mobile communications and Internet access. The available spectrum is commonly referred to as TV whitespace, which is made up of the guard bands and unused TV channels between channel 2 and channel 51 (corresponding to 54 MHz to 698 MHz). To avoid interference with digital TV broadcasts and other incumbent systems, such as wireless microphone systems, radios that use the TV whitespace will be required to register and receive a channel map of available channels that may be used for the communications activity of the radio system. Current regulations require these radio systems to register every twenty-four hours. Also, for mobile radios, if the radio moves into a new location, a new registration is required. Other regulations on the radios are present, such as transmitted power limits for different types of radios. Additional information regarding the regulation of TV whitespace may be found in FCC 08-260, Second Report and Order and Memorandum Opinion and Order, Adopted Nov. 4, 2008 and Released Nov. 14, 2008, the entirety of which is incorporated herein by reference. Similar proposals have been made in places other than the United States. For example, Ofcom in the United Kingdom has described access to certain spectrum by cognitive radios in "Digital Dividend: Cognitive—Access Consultation on License-Exempting Cognitive Devices Using Interleaved Spectrum," published Feb. 16, 2009.

SUMMARY

Although the FCC has identified parameters for the use of TV whitespace and the subleasing of spectrum, there is room for improvement in the manner in which corresponding spectrum is allocated among radio systems and subsequently managed. For instance, if a higher priority user requires spectrum, TV whitespace users may be forced to relinquish spectrum at least on a temporary basis. In another exemplary context, secondary market users of spectrum may be required to relinquish spectrum if a higher priority spectrum user has a need for the spectrum. Disclosed are techniques for managing situations where spectrum use by one party is preempted by spectrum needs of another party.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
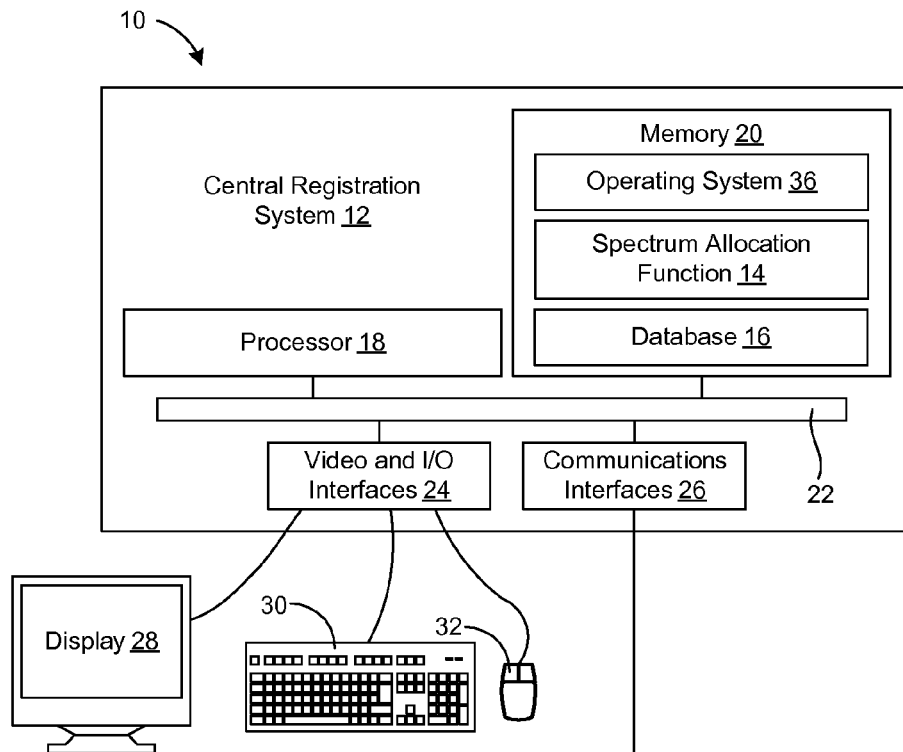
FIG. 1 is a schematic view of an exemplary system for managing spectrum allocation.
Figure 1:
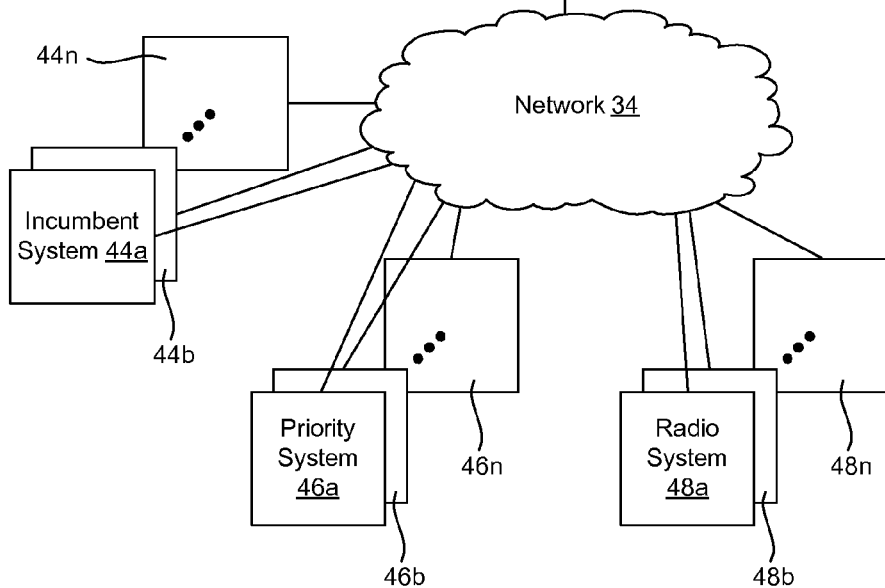

Embodiments will now be described with reference to the drawings, wherein like reference numerals are used to refer to like elements throughout. It will be understood that the figures are not necessarily to scale.

A. OVERVIEW

A(1). Parties

Various entities that may have a relationship to electromagnetic spectrum for use in wireless communications are described in this document. One entity is a government or regulatory agency. In the United States, the governmental agency may be the FCC. The governmental agency controls the rules and/or regulations for how wireless spectrum may be used. Exemplary rules governing certain spectrum are described in the above-mentioned FCC 08-260. Another exemplary agency is Ofcom in the United Kingdom.

In some situations, there may be a spectrum holder. A spectrum holder is any entity having the authority to release spectrum use to another entity by granting the other entity access to the spectrum. The granting of access may be a temporary permission to use spectrum that is associated with the holder. Therefore, the access grant need not be a lease or a sub-lease, as defined by the FCC. The holder may be, but is not limited to, a government or regulatory agency (e.g., in the United States, the FCC), a Commission licensee (e.g., in the United States, an entity that has licensed spectrum directly from the FCC in the primary spectrum market), or a secondary market licensee. In some embodiments, the holders may offer spectrum for use by others through an exchange or matching platform that matches available spectrum to spectrum needs.

Another party may be a spectrum user, or simply a user. A user is any entity or wireless communications system that has a need for spectrum in order to carry out wireless communications, such as for offering wireless communications services to others or Internet access to mobile client devices. With the transition of analog TV broadcasts to digital TV broadcasts, radios may seek registration in accordance with FCC 08-260 to gain access to TV whitespace. These radios are referred to TV whitespace band radios (TVBDs). Therefore, one exemplary user may be a TVBD. Other users may be users that request or bid on spectrum from an exchange platform.

One type of user may be a priority spectrum user. Exemplary priority spectrum users may include emergency responders or government agencies. Other exemplary priority users may include incumbent spectrum users that have priority to certain spectrum by regulation or have "grandfather" provisions so as to have access to certain spectrum. For example, incumbent users to spectrum in the historical analog TV broadcast channels are TV stations that broadcast using digital signals. Other exemplary incumbent users to spectrum in the historical analog TV broadcast channels are wireless microphone systems.

Still another party may be an entity or system that manages registration of the various users of the historical analog TV broadcast channels. This party may carry out such management using a central registration system as described in greater detail below.

Another party may be a spectrum broker that hosts an automated spectrum matching engine or exchange over which holders may transfer spectrum use rights to users.

A(2). Wireless Communications Context

Aspects of the disclosed systems and methods are independent of the type or types of radio devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum. Furthermore, the methods and systems are generic to modulation schemes, harmonic considerations, frequency bands or channels used by the radio devices, the type of data or information that is transmitted, how the radio devices use received information, and other similar communications considerations. Thus, the systems and methods have application in any suitable environment.

In addition, the systems and methods are primarily described in the exemplary context of managing TV whitespace. However, the systems and method may be applied to other circumstances where radios register for spectrum use or obtain spectrum use rights, such as through a matching engine or exchange system.

In the case of managing spectrum related to TV whitespace, radio systems with priority to the spectrum, including incumbent radio systems, have spectrum use rights that are superior to secondary spectrum users, such as TVBDs. The secondary radio systems may use spectrum that is interleaved with spectrum used by priority (or primary) radio systems. A registration system to manage such spectrum use and allocation is described in U.S. patent application Ser. No. 12/423,094 filed Apr. 14, 2009, the disclosure of which is incorporated herein by reference in its entirety.

Although aspects of the disclosed systems and methods are described in the exemplary context of TV whitespace, the disclosed concepts may be applied to other operational scenarios. One operational scenario includes a system in which requests or bids for spectrum are matched to available spectrum that is posted on a spectrum brokerage or exchange. A system that manages spectrum use and allocation in this operational context is described in U.S. Ser. No. 12/042,543 filed Mar. 5, 2008, the disclosure of which is incorporated herein by reference in its entirety. In this exemplary context, the user may be granted a spectrum certificate or other data object that specifies the spectrum that may be used by the user in terms of communications-related information, such as geography, frequency, spectral mask, time, and power limits.

B. System Architecture

The following system architecture is described for the exemplary context of a system that manages TV whitespace. Modifications to the system for use in other operational contexts may be made.

With reference to FIG. 1, illustrated is a schematic block diagram of a computer-based system 10 capable of executing computer applications (e.g., software programs). The system 10 may include a central registration system 12 that is implemented using computer technology. The central registration system 12 may be configured to execute a spectrum allocation function 14 and to store a database 16 that contains data regarding spectrum information that is used by the spectrum allocation function 14.

In one embodiment, the spectrum allocation function 14 is embodied as one or more computer programs (e.g., one or more software applications including compilations of executable code). The computer program(s) and/or database 16 may be stored on a machine (e.g., computer) readable medium, such as a memory in the form of a magnetic, optical or electronic storage device (e.g., hard disk, optical disk, flash memory, etc.).

To execute the function 14, the system 12 may include one or more processors 18 used to execute instructions that carry out a specified logic routine(s). In addition, the system 12 may have a memory 20 for storing data, logic routine instructions, computer programs, files, operating system instructions, and the like. As illustrated, the function 14 and the database 16 may be stored by the memory 20. The memory 20 may comprise several devices, including volatile and non-volatile memory components. Accordingly, the memory 20 may include, for example, random access memory (RAM) for acting as system memory, read-only memory (ROM), hard disks, floppy disks, optical disks (e.g., CDs and DVDs), tapes, flash devices and/or other memory components, plus associated drives, players and/or readers for the memory devices. The processor 18 and the components of the memory 20 may be coupled using a local interface 22. The local interface 22 may be, for example, a data bus with accompanying control bus, a network, or other subsystem.

The system 12 may have various video and input/output (I/O) interfaces 24 as well as one or more communications interfaces 26. The interfaces 24 may be used to operatively couple the computer system 10 to various peripherals, such as a display 28, a keyboard 30, a mouse 32, other input devices, a microphone (not shown), a camera (not shown), a scanner (not shown), a printer (not shown), a speaker (not shown) and so forth. The communications interfaces 26 may include for example, a modem and/or a network interface card. The communications interfaces 26 may enable the system 10 to send and receive data signals, voice signals, video signals, and the like to and from other computing devices via an external network 34 (e.g., the Internet, a wide area network (WAN), a local area network (LAN), direct data link, or similar systems). The interface between the system 12 and any operatively interfaced device or network may be wired or wireless.

The memory 20 may store an operating system 36 that is executed by the processor 18 to control the allocation and usage of resources in the system 12, as well as provide basic user interface features. Specifically, the operating system 36 controls the allocation and usage of the memory 20, the processing time of the processor 18 dedicated to various applications being executed by the processor 18, and the peripheral devices, as well as performing other functionality. In this manner, the operating system 36 serves as the foundation on which applications, such as the function 14, depend as is generally known by those with ordinary skill in the art. The operating system 36 also may control much of the user interface environment presented to a user, such as features of the overall graphical user interface (GUI) for the system 12.

In one embodiment, the system 12 may be configured as a server that executes the function 14 to host the below-described spectrum management functions. The spectrum management functions include providing spectrum certificates to qualified parties so that the parties may make use of spectrum for wireless communications. The spectrum management functions also may include revoking one or more spectrum certificates if a higher priority system has a need for spectrum that is part of the spectrum certificate(s).

In the illustrated example, these parties include one or more incumbent spectrum user systems 44a through 44n (e.g., TV stations) and priority systems 46a through 46n. Exemplary priority systems 46 may include, for example, the radio systems of emergency workers (e.g., fire, ambulance, police, search and rescue, hazardous material handlers, and other public safety personnel), government agencies, the military, and so forth. Other exemplary priority systems may include the radio systems of the media that are used by reporters and correspondents to cover temporary events, such as news conferences, political gatherings, sporting events, and other news-worthy events. In some cases, a holder of the primary license to spectrum may be a priority user with respect to a sub-licensee or another party that has been granted use rights.

Also, the parties may include one or more radio systems 48a through 48n. In the exemplary context of managing spectrum for TV whitespace, the radio systems 48a through 48n may be TVBD radio systems. Each radio system 48 may be an individual radio device or a network of radio devices. Also, each radio system 48 may include at least one transceiver for engaging in wireless communications and a controller for managing radio system operation, including registration and channel selection functions, and revocation compliance functions to comply with the revocation of a spectrum certificate as described below.

It is contemplated that there may be hundreds or thousands of incumbent systems and thousands or millions of TVBD radio systems. Under current FCC procedure, TVBD radios will register every twenty-four hours. Also, for mobile TVBD radios that do not have a fixed location, the mobile TVBD radio will register each time the TVBD radio changes location. Therefore, to handle registration volume of the systems 44, 46 and 48, the central registration system 12 may be scaled to handle a high volume of registration requests. Furthermore, the central registration system 12 may have a distributed architecture, and may include plural server systems. The systems 44, 46 and 48 may interact with the central registration system 12 for registration purposes over the Internet using electronic messaging. Furthermore, the function 14 may be considered an expert system for generating meaningful spectrum certificates that increase the operational capacity of the corresponding spectrum and reduces interference among systems that use the spectrum.

While the registration process for at least the radio systems 48 may be fully automated, the function 14 may host an Internet-style website for the various parties to conduct initial enrollment with the system 12, conduct manual registration if needed, access various tools and reports supplied by the function 14, and so forth.

Use of one or more priority systems 46 may arise with little or no prior scheduling in terms of time and location. The system 12 manages spectrum allocation and use by the radio systems 48 to reduce or eliminate interference between the radio systems 48 and the priority systems 48.

C. Spectrum Allocation

Figure 2:
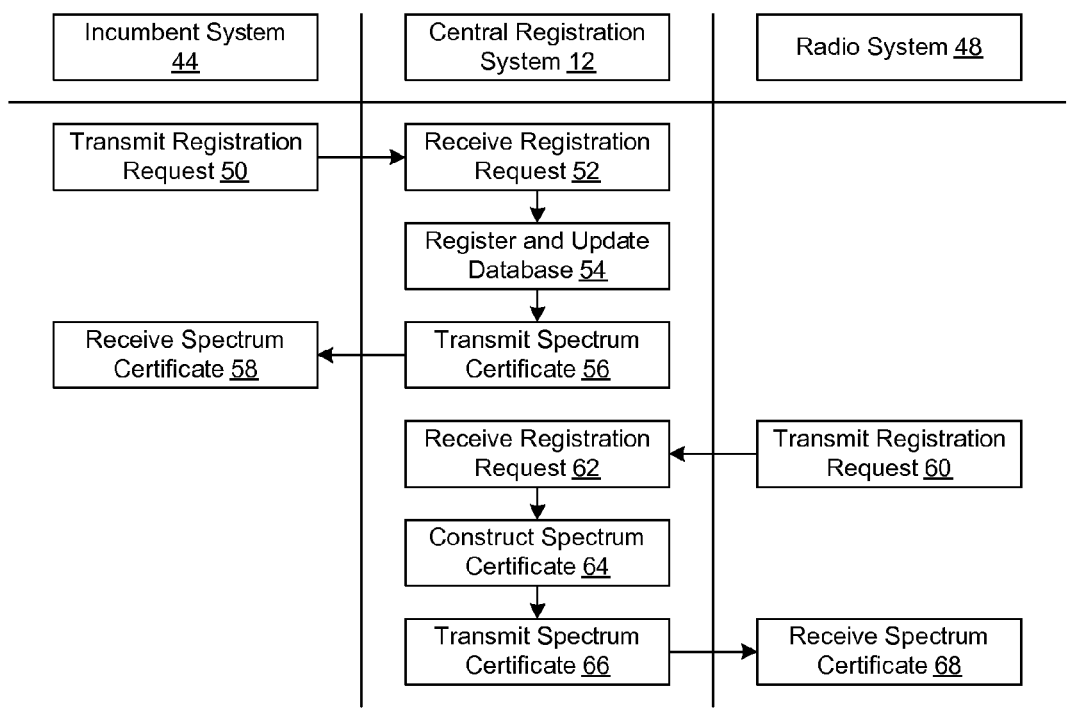
FIG. 2 is a flow diagram representing exemplary actions taken by various components of the system of FIG. 1.

With additional reference to FIG. 2, illustrated are logical operations to implement exemplary methods of managing spectrum. Steps carried out by the central registration system 12, the incumbent system 44, and the radio system 48 are illustrated. Therefore, the exemplary methods may be carried out, in part, by executing an embodiment of the spectrum allocation function 14 and, in part, by respective control circuits of the radio system 48 and the incumbent system 44. Although the flow chart shows a specific order of executing functional logic blocks, the order of executing the blocks may be changed relative to the order shown. Also, two or more blocks shown in succession may be executed concurrently or with partial concurrence. Furthermore, the registration process for one incumbent system 44 and one radio system 48 is described. The described functions may be repeated for all incumbent system 44 and for all radio systems 48 so that appropriate spectrum certificates are provided to each qualified spectrum user.

Priority systems 46 may register for spectrum in the same manner as incumbent systems 44 or in the same manner as radio systems 48. Alternatively, one or more types of priority systems 46 may be entitled to use certain frequency bands without registration. In this case, a user generated or automated notification may be generated and communicated to the system 12 so as to inform the system 10 of the spectrum use by the priority system(s) 46.

C(1). Incumbent Devices

Operators of appropriate incumbent systems may enroll with the central registration system 12 to make registration for spectrum use in accordance with governmental agency regulation. For example, operators of licensed TV stations may enroll with the system 12 and request registration in block 50. The registration request may be received by the system in block 52.

Information that is provided by the TV station may include channel definitions and broadcast parameters, such as antenna location, antenna configuration, broadcast power and so forth. Other information, such an operator identity, operator contact information, FCC license information, and other profile information may be supplied to the system 12. From this information, the system 12 may complete the registration in block 54 and, in block 56, transmit a registration in the form of a spectrum certificate to the TV station. The TV station may receive the spectrum certificate in block 58.

The spectrum certificate may be a data object that contains a channel map of available channels under which the TV station may operate. For a TV station, it is contemplated that the channel map will be the same as the channel definitions supplied by the TV station. The spectrum certificate also may include information concerning a time window in which the spectrum certificate is valid. At or near the expiration of the time window, the TV station may reregister to obtain a new spectrum certificate. In other embodiments, the TV station may operate without a spectrum certificate, in which case blocks 56 and 58 may be omitted.

Returning to the functions of block 54, the system 12 may generate a grade B contour for the TV station. In one embodiment, the grade B contour may be calculated using information relating to the TV station, such as channel, antenna height, antenna site, transmitter power, and so forth. The grade B contour and the channel map contained in the associated spectrum certificate may be logged in the database 16. The logged information provides a record of the location in which the TV station operates and the channel(s) (e.g., frequency or frequencies) used by the TV station. In one embodiment, the location may be a two dimensional area. The location may be defined in any appropriate manner, such as by using sets of coordinates (e.g., longitude and latitude, world geodetic system (WGS), geographical information system (GIS) data), zip codes, metropolitan boundaries, "FCC defined areas" (e.g., major trading areas (MTAs) or basic trading areas (BTAs)), and so forth. As will be understood, the location and corresponding channel map associated with a TV station is used spectrum. To avoid interference, allocation of used spectrum to another system should be minimized.

In addition to TV stations, other types of incumbent systems 44 may enroll with the central registration system 12 to make registration for spectrum use in accordance with governmental agency regulation. Incumbent TV whitespace operators may include, for example, wireless microphone systems or a cable head end. Other types of incumbent users are possible. As indicated, priority systems 46 may register in the manner that incumbent systems register for spectrum access. Similar to the registration of TV stations, information may be collected from the alternative types of incumbent and/or priority systems so as to generate an associated grade B contour for the registering system. The grade B contour and any corresponding channel map generated for the system 44 or 46 may be logged in the database 16. The logged information provides a record of the location in which system 44 or 46 operates, the channel(s) (e.g., frequency or frequencies) used by the system 44 or 46 and, if applicable, when the system 44 or 46 operates. The location may be a two dimensional area are described above. As will be understood, the location and corresponding channel map associated with a system 44 or 46 is used spectrum during the times of operation. To avoid interference, allocation of used spectrum to another system should be minimized. In addition, and as described below, registration by an incumbent system 44 or a priority system 46 may result in the generation of an exception that, in turn, results in revocation of a spectrum certificate that has been previously provided to a radio system 48.

C(2). Whitespace Band Radios

With continued reference to FIGS. 1 and 2, the radio system 48 may register with the central registration system 12 to receive a spectrum certificate with information relating to available channels in which the radio system 48 may operate. The available channels may not be contiguous in frequency. In one embodiment, the radio system 48 may undergo an initial enrollment by supplying various information, such as FCC identifier (FCC id), device serial number, contact information of a responsible person or entity (e.g., contact name, street and/or mailing address, electronic mail address, telephone number, etc.), and any other appropriate information.

The FCC id and serial number may be validated against data that is previously supplied by radio equipment manufacturers. Also, using the data from the radio equipment manufacturer or information supplied by the radio system 48, the central registration system 12 may identify characteristics of the radio system 48, such as fixed or mobile device, radio type, and so forth.

An exemplary registration process for the radio system 48 may commence in block 60 where the radio system 48 transmits a registration request to the central registration system 12. The registration request may identify the radio system 48 and may include information to ascertain a location of the radio system 48. Location information may be determined in any appropriate manner. For instance, location may be determined using a triangulation method. A common triangulation method is by using a global position system (GPS) or assisted GPS (AGPS) approximation of location. Another location determination technique is to use a postal address, such as a street address or a zip code (e.g., in the United States a "zip+4" code may provide a sufficiently accurate location estimation).

Another location determining technique may involve reverse triangulation using a channel map provided by the radio system 48. For instance, the radio system 48 may identity the channels on which the radio system 48 detects (or "sees") transmission activity and corresponding signal strengths. From matching this information to known service contours of the radio devices, the central registration system 12 may estimate the location of the radio system 28. Also, the information provided by the radio system 48 represents data of actual broadcasts by other radio devices that may be used to adjust calculated contours for the corresponding incumbent systems 44, 46, or other radio systems. In this manner, the database of used channels for the location the radio system 48 may be adjusted based on feedback from various radio systems 48.

In block 62, the registration request may be received by the central registration system 12. Then, in block 64, the central registration system 12 may process the registration request. A spectrum certificate for the requesting radio system 48 may be constructed. In one embodiment, data maintained in the database 16 may be compared to the location contained in the request to identify any available channels that the radio system 48 may use for wireless communications. The identification may include determining which channels are in use by incumbent systems 44 and/or priority systems 46 for the location of the radio system 48. Those channels will be considered not available for use by the radio system 48. Also, the type of radio system making the request and/or the spectral mask of the radio system making the request may indicate that certain channels are unavailable. In the exemplary context of TV whitespace, any unused channels for the location of the radio system 48 and that the radio system 48 is permitted to use based on radio type and spectral mask may be considered TV whitespace that is available for use by the radio system 48. In effect, the channel map results from a mapping of available channels into the spectral mask of the requesting radio system 48.

A channel map for the radio system 48 may established using the channel availability information. In one embodiment, the channel map is a list of available channels. In another embodiment, the channel map is a list of channels that are not available. In another embodiment, the channel map is a complete list of channels across a spectrum range in question and corresponding availability or non-availability status of each channel.

In another embodiment, information in the spectrum certificate may be used to provide more guidance to the radio system 48 beyond a binary-type value of whether a channel is available or not available for use. In addition, the information may be constructed in a way to steer the channel choice of the radio system 48. An exemplary reason to lead the radio system 48 to choose one channel over another channel includes avoiding interference with operation of another radio system 48 or incumbent system 44. Another exemplary reason to lead the radio system 48 to choose one channel over another includes maximizing spectrum usage by distributing radios systems 48 among various channels.

The spectrum certificate may be a data object and, in addition to the channel map, the spectrum certificate may contain other relevant information. For example, a time at which the spectrum certificate expires may be present. At the arrival of the specified time, the radio system 48 may reregister. Following current FCC guidelines for use of TV whitespace, the spectrum certificate may be valid for twenty-four hours. However, it is possible that there may be situations in which a spectrum certificate is valid for less than or more than twenty-four hours.

For instance, the time frame for which the spectrum certificate is valid may be related to the dynamic nature of radio system 48 and/or the dynamic nature of other neighboring (e.g., commonly located or nearby) radio systems 48. The radio systems 48 may be dynamic in the sense that some of the radio systems 48 may not use spectrum in the same location at all times. For example, some of the radio systems 48 may be mobile, and some of the radio systems 48 may not operate a certain times or may be desire spectrum for a limited period of time (e.g., a week or a month). Therefore, the time period that the spectrum certificate is valid may be determined using a time period requested by the radio system 48 and/or knowledge about the spectrum use plans by other radio systems 48. Using these factors, the time period specified in the spectrum certificate may be determined so that the associated channel map is viable for as long as possible, while minimizing the possibility that conditions leading to the generation of the channel map have changed.

Following block 64, the logical flow may continue in block 66 where the spectrum certificate with the channel map may be transmitted to the requesting radio system 48. The spectrum certificate may be received by the requesting radio system 48 in block 68. Following receipt of the spectrum certificate, the radio system 48 may select one of the available channels for use in connection with the wireless communications activity of the radio system 48. The radio system 48 may then carry out wireless communications activity using the selected channel. In one embodiment, the selected channel may be communicated back to the central registration system 12 for use in processing other registration requests and/or managing the below-described exceptions.

D. Exception Handling

As previously indicated, the techniques disclosed in this document may be applied not only to the management of spectrum whitespace, but to other spectrum management approaches. For example, the techniques that are described in the following portions of the document may be used to carry out exception handling to situations where spectrum use rights are transferred from one party to another over an exchange or matching system. Such an exchange or matching system may segment spectrum by one or more of geography, frequency or time to allow multiple radio systems to operate simultaneously. The operation of the radio systems may be regulated by a spectrum certificate that defines, in part, a period of time that the radio system may use specified spectrum, a location and a frequency.

During the time that a spectrum certificate is valid it is possible that a priority system 46 may have a need for at least some of the spectrum that is made available to or is otherwise used by a radio system 48 through the spectrum certificate. During this time, the priority system 46 has use rights that dominate the radio system 48 such that the use rights of the radio system 48 may require modification. In some cases, the dominating rights may dictate that the radio system 48 relinquish all use of the spectrum specified under the spectrum certificate. In other cases, the dominating rights may dictate that the radio system 48 has less available spectrum in terms of one or more of geography, frequency, transmitted power, or time.

Figure 3:
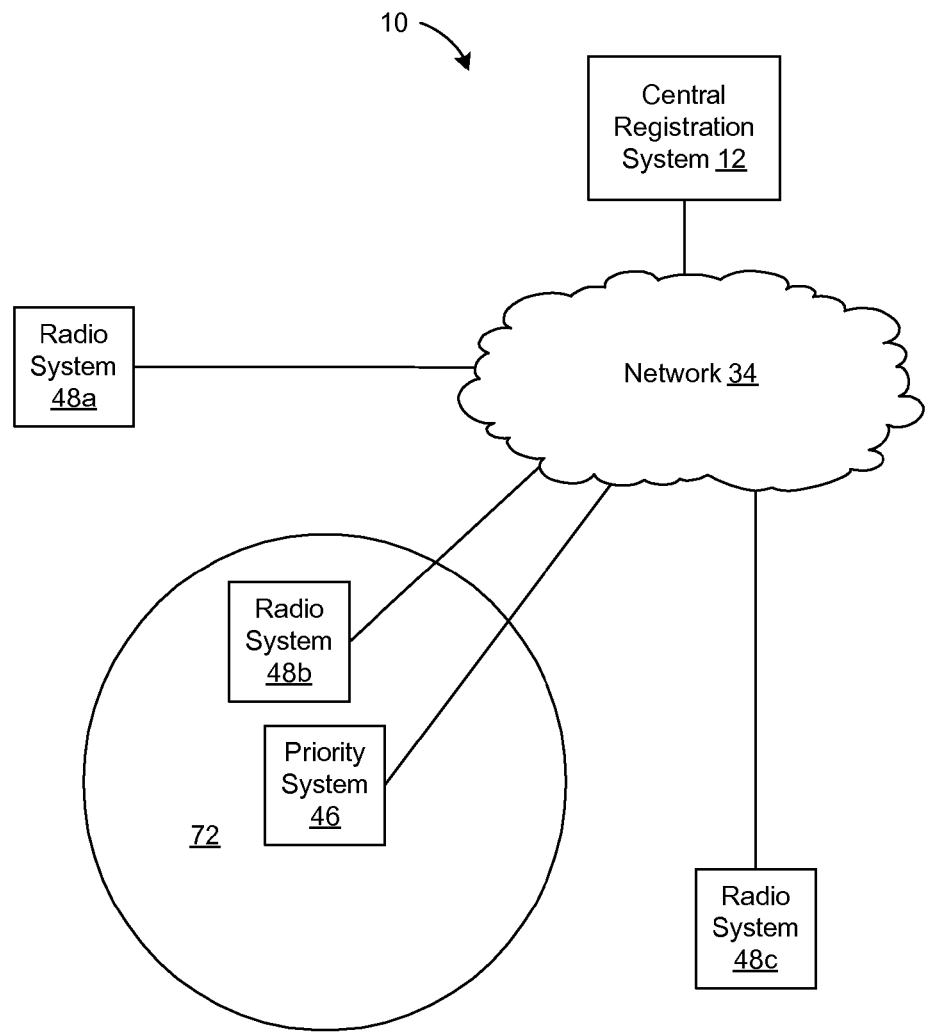
FIG. 3 is a schematic view of portions of the system 10 during a temporary event that results in preemptive spectrum use.

With additional reference to FIG. 3, illustrated are portions of the exemplary system 10 during a temporary event that results in the preemptive spectrum use by a priority system 46. For purposes of an example, the radio systems 48 may be base stations that offer wireless Internet or other services to client devices. For instance, the radio systems 48 may be operated by hotels as a service to their guests. In the example, the radio systems 48 may be TVBDs that have registered with the central registration system 12 and that have received respective spectrum certificates that identify available TV whitespace channels.

In furtherance of this example, the priority system 46 may be a wireless microphone system used by a roving television news crew. In the example, a news event (e.g., a press conference) arises near the location of the radio system 48b. As will be appreciated, the details of the example are provided for demonstrative purposes and represent just one exemplary operational scenario. In a different example, the priority system 46 may be emergency workers that respond to a natural disaster or man-made event.

D(1). Spectrum Certificate Revocation

Figure 4:
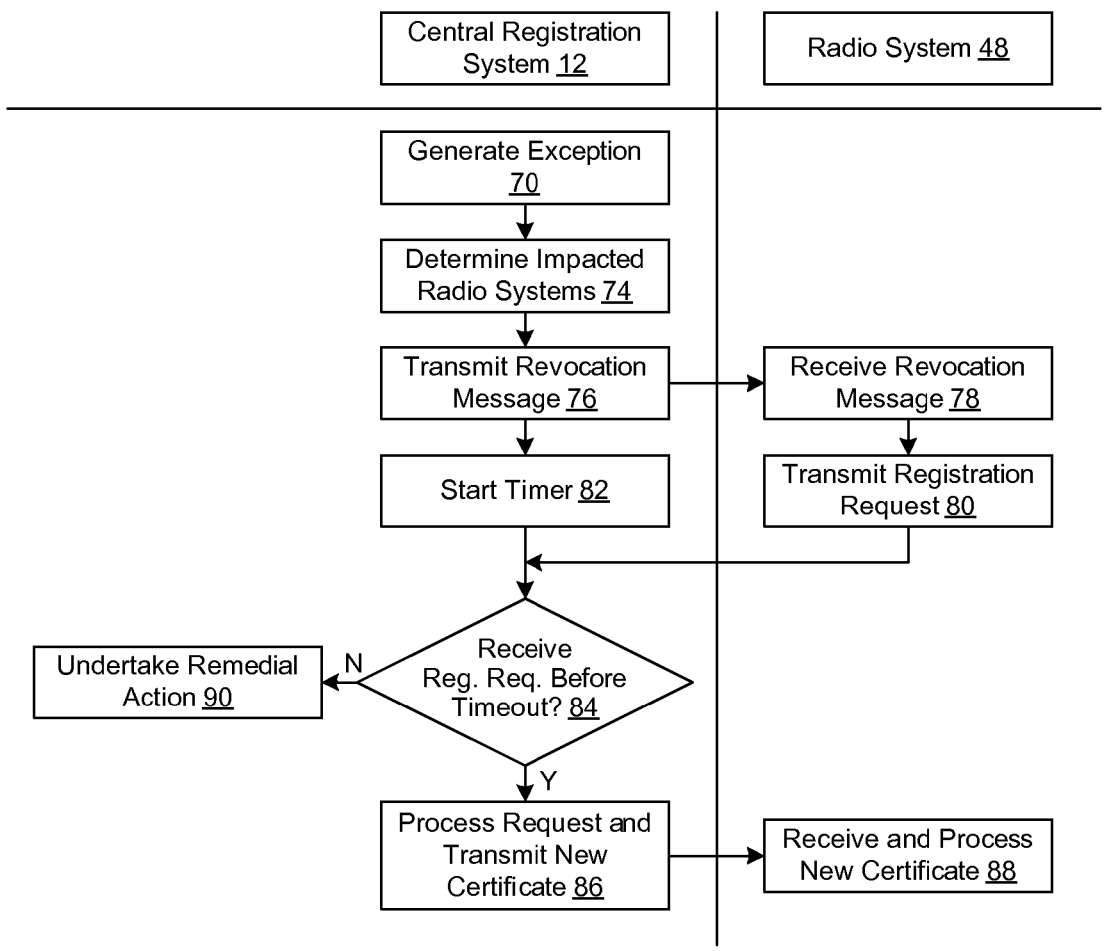
FIG. 4 is a flow diagram representing an exemplary technique for managing the preemptive spectrum use.

With additional reference to FIG. 4, illustrated are logical operations to implement exemplary methods of managing the preemptive spectrum use. Steps carried out by the central registration system 12 and the radio system 48 are illustrated. Therefore, the exemplary methods may be carried out, in part, by executing an embodiment of the spectrum allocation function 14 and, in part, by control circuitry of the radio system 48. Although the flow chart shows a specific order of executing functional logic blocks, the order of executing the blocks may be changed relative to the order shown. Also, two or more blocks shown in succession may be executed concurrently or with partial concurrence.

The logical flow may start in block 70 where an exception is generated. An exception may be considered a logic state that reflects any situation or event where a primary system 46 has a need for spectrum that is currently available for use by a lower priority radio system 48. As indicated, availability of spectrum for use by a radio system 48 is typically made through a spectrum certificate that has been provided to the radio system 48.

An exception may be generated in response to receipt of a registration request from a priority system 46. Receipt of other electronic data also may result in the generation of an exception. For instance, it is possible that certain priority systems 46 may be configured to generate an exception request message that is transmitted to the central registration system 12. In one embodiment, the priority system 46 must have prior authentication to invoke an exception. In still other embodiments, an exception may be generated manually by user action by a user that has prior authorization to create the exception or enters information showing a requisite level of authority. Computer security techniques (e.g., password protection or biometric protection) may be used to authenticate a previously authorized user. To create the exception, the user may be prompted to enter various information items, such as the nature of the event, the location of the priority system 46, the radio frequencies that will be impacted, and/or the duration of the event.

Referring to FIGS. 3 and 4, the exception may specify a location. Typically, this location will correspond to the location of the priority system 46. From the location, an area of impact 72 for the exception may be determined. The area of impact 72 may be determined by extending a predetermined radius in all directions from the location. In one embodiment, the radius may be about one kilometer. In this embodiment, the resulting area of impact 72 is a circle with a radius of one kilometer. It will be appreciated that the length of the radius may be different. In addition, the shape of the area of impact 72 may be different than a circle. Also, the area of impact 72 may be based on the type of radio device(s) associated with the priority system 46 and/or based on the manner in which the radio devices may be used. For example, a predetermined area of impact 72 for a wireless microphone systems may be relatively small (e.g., a circle with a one kilometer radius) and a predetermined area of impact 72 for radio systems used by a search and rescue team may be relatively large (e.g., a square of five kilometers by five kilometers).

In other embodiments, the area of impact 72 may be based on a predetermined boundary surrounding the location of the priority system 46. Exemplary predetermined boundaries may be the boundary of a postal code (e.g. a five digit or a three digit zip code in the U.S.), a city, a county, a state, a census block, or an FCC-defined area, such as a major trading area (MTA), a basic trading area (BTA), a cellular market area, or an economic area grouping. If the location of the priority system 46 is near an edge of the predetermined boundary so as to be susceptible to interference from radio devices 48 from a neighboring area, then the area of impact 72 may be the aggregate of two or more adjacent areas delineated by predetermined boundaries (e.g., a plurality of postal codes).

Typically, the exception will be related to a temporary event that is expected to last a specified number of hours, one day (e.g., a 24 hour period), or a specified number of days. If it is expected that the underlying event will last longer than a predetermined duration, or may be a widespread event to cover a relatively large geographic area, then the spectrum usage by the priority system 46 may be handled in a manner other than creating an exception. For instance, the spectrum use by the priority system 46 may be registered with the central registration system 12 as a permanent entry or an entry with a specified duration and geographic area.

In block 74, radio systems 48 that are impacted by the presence of the priority system 46 may be determined. In one embodiment, the central registration system 12 may track the location of each radio system 48 using the information collected at the time that the radio systems 48 registered and/or using corresponding spectrum certificates. In the case of radio systems 48 that acquired spectrum use rights through an exchange or other spectrum availability matching engine, the location of the radio system 48 also may be known and/or tracked through corresponding spectrum certificates. The known locations of the radio systems 48 may be searched to identify any radio systems 48 that have overlap with the area of impact 72 and have spectrum certificates for frequencies that may contend with the priority system 46 so as to be a potential source of interference to the priority system 48.

In one embodiment, a tolerance level may be associated with the priority system 46. The tolerance level may indicate whether to include or exclude radio systems 48 that fall within a predetermined distance of the boundary of the area of impact 72 in the group of radio systems 48 that may be a potential source of interference to the priority system 46. Radio systems 48 that are indicated as potential sources of interference may be considered impacted radio systems 48.

In the case where the radio system 48 is a TVBD, the spectrum certificate may identify a number of available channels, but the channel used by the radio system 48 may not be known to the central registration system 12. In this case, the radio system 48 still may be considered impacted since at least one channel that has been identified as being available to the radio system 48 now has a preemptive user.

The operations of block 74 identifies impacted radio systems 48. Using the illustrated example of FIG. 3, radio systems 48a and 48c are not impacted since they have locations outside the area of impact 72. But radio system 48b is impacted since radio system 48b is located within the area of impact 72.

Following determination of the impacted radio systems 48, a revocation message may be transmitted to the impacted radio systems 48 in block 76. In one embodiment, the revocation message is transmitted using a push delivery technique. In one embodiment, the revocation message may be a termination of the validity of the spectrum certificate under which the radio system 48 operates. In this manner, the spectrum certificate may be rescinded due to the potentially competing spectrum use by the priority system 46. In most embodiments, rescission of the spectrum certificate will result in the radio system 48 ceasing use of the spectrum defined by the spectrum certificate so as to vacate the frequency or frequencies that are used by the priority system 46. For example, the revocation message may be received in block 78 and, in response to receipt of the revocation message, the radio system 48 may cease operation under the spectrum certificate.

In other embodiments, it may be possible for the radio system 48 to continue operations under the spectrum certificate. For instance, the spectrum certificate or the revocation message may specify alternative spectrum that may be used by the radio system 48 during the exception. In another approach, the revocation message may revoke only a portion of the spectrum specified by the spectrum certificate. In the case where the radio system 48 is a TVBD, the revocation message may amend the spectrum certificate to indicate that one or more previously available channels are now not unavailable. Alternatively, the revocation message may be or may include a new spectrum certificate that contains a new list of available or unavailable channels.

It will be understood that the revocation message is a form of communication between the radio system 48 and the central registration system 12 to free spectrum from the impacted radio systems 48 for use by the priority system 46. Other forms of communication may include, for example, polling the impacted radio systems 48 for their actual channel usage and determining if available spectrum exists for the priority system 46. If spectrum is not available for the priority system 46 based on actual spectrum usage by the radio systems 48, then the central registration system 12 may coordinate with the impacted radio systems 48 so as to have the impacted radio systems 48 stop using spectrum that may contend with the priority system 46.

D(2). Revocation Message Delivery Verification

Continuing with the illustrated example of FIG. 4, the logical flow is arranged to allow for an acknowledgement from the radio system 48. In the illustrated example, where the radio system 48 is a TVBD, the acknowledgement is a new registration request. In this manner, the revocation message prompts the radio system 48, in block 80, to enter the process of requesting registration in the same manner as if the radio system 48 had been powered on or changed location, or the spectrum certificate had expired. However, the acknowledgement may be in another form, such as a simple acknowledgment message.

There is a possibility that a communication issue between the central registration system 12 and the radio system 48 results in a failure of the revocation message to be received by the radio system 48. Without alternative remedial action, this situation would result in the radio system 48 operating in accordance with the spectrum certificate until the spectrum certificate reaches its normal expiration. But this may adversely affect the priority system 46 by causing interference.

In one embodiment, the central registration system 12 is configured to take steps to address the possibility that the radio system 48 does not receive the revocation message or fails transmit an expected acknowledgement, which may be a registration request. For instance, in block 82, the central registration system 12 may commence a timer. Then, in block 84, if a registration request or other expected acknowledgement is received before a predetermined time elapses since transmitting the revocation message, an assumption may be made that the revocation message was received and properly processed by the radio system 48. This may result in a positive determination in block 84. The predetermined time may be, for example, one minute, five minutes, ten minutes, or some other length of time.

Upon a positive determination in block 84, the logical flow may proceed to block 86. In block 86, the central registration system 12 may process the registration request that was sent by the radio system 48 in block 80. A new spectrum certificate may be transmitted to the radio system 48. The new spectrum certificate may be received by the radio system 48 in block 88.

If a negative determination is made in bock 84, the logical flow may proceed to block 90 where remedial action is taken. In one embodiment, an attempt may be made to transmit the revocation message to the radio system 48 using a backup communication pathway, such as a pathway that does not rely on the network 34. In another embodiment, action may be taken to have a person or an automated system turn off the radio system 48. In still another embodiment, the remedial action may include planning around the operation of the radio system 48. For example, the priority system 46 may select a channel that is determined to be available through use of spectrum sniffing, or may use an alternative or backup channel.

D(3). Communication Pathway Verification

Figure 5:
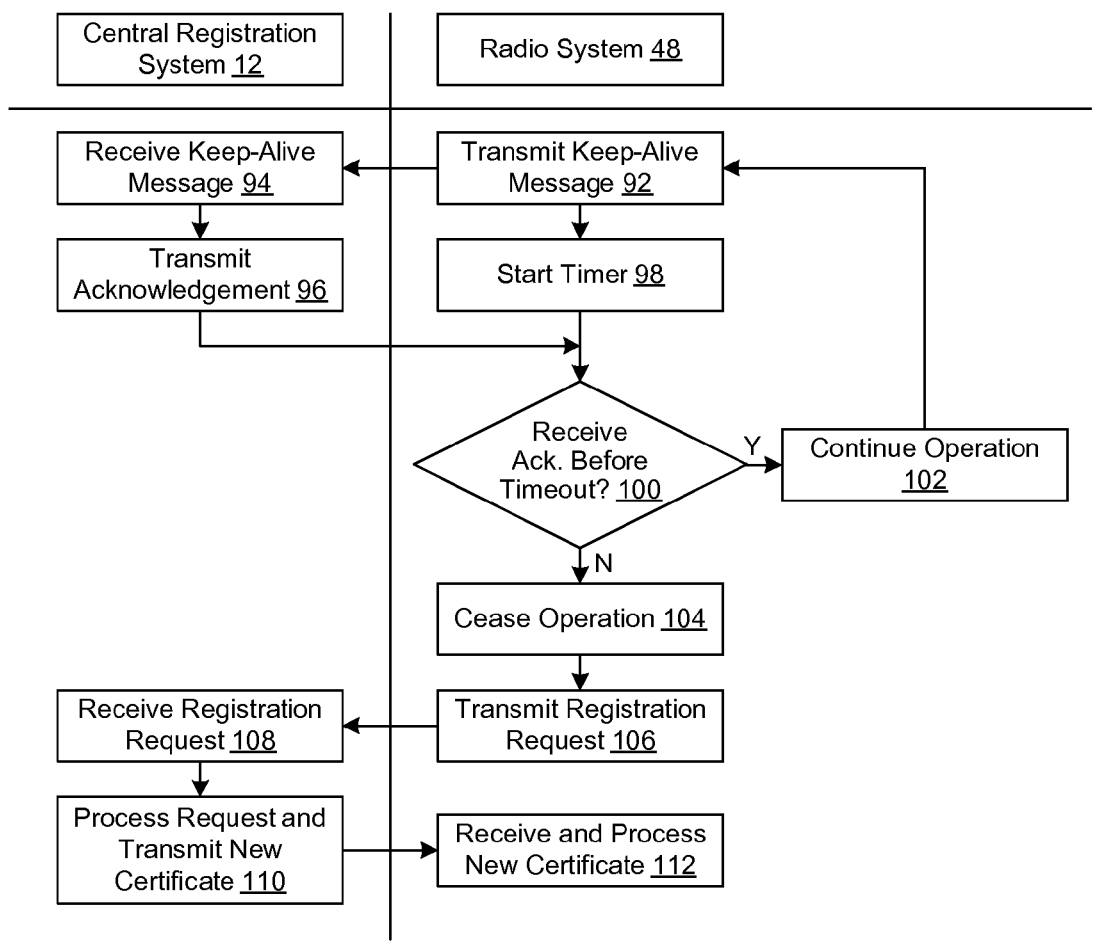
FIG. 5 is a flow diagram representing an exemplary technique for verifying communication between a radio system and a central spectrum management system.

With additional reference to FIG. 5, illustrated are logical operations to actively verify that communications between the radio system 48 and the central registration system 12 are maintained so that, in the event of an exception, a revocation message may be successfully delivered to the radio system 48. In one embodiment, the steps of FIG. 5 may be carried out whenever the radio system 48 is operating in accordance with a spectrum certificate.

In FIG. 5, steps carried out by the central registration system 12 and the radio system 48 are illustrated. Therefore, the exemplary methods may be carried out, in part, by executing an embodiment of the spectrum allocation function 14 and, in part, by control circuitry of the radio system 48. Although the flow chart shows a specific order of executing functional logic blocks, the order of executing the blocks may be changed relative to the order shown. Also, two or more blocks shown in succession may be executed concurrently or with partial concurrence.

The logical flow may commence in block 92 where the radio system 48 transmits a keep-alive message to the central registration system 12. Keep-alive messages may be transmitted on a periodic basis, such as every five minutes. The keep-alive message may take any suitable form and, as used herein, a keep-alive message includes, but is not limited to, a standard ping for testing an Internet protocol connection. The keep-alive message may be received by the central registration system 12 in block 94.

In response to receipt of the keep-alive message in block 94, the central registration system 12 may transmit an acknowledgment to the radio system 48 in block 96. In one embodiment, the radio system 48 is configured to take steps to address the possibility that the central registration system 12 does not receive the keep-alive message or fails to receive an expected acknowledgement. For instance, in block 98, the radio system 12 may commence a timer. Then, in block 100, if an expected acknowledgement is received before a predetermined time elapses since transmitting the keep-alive message, an assumption may be made that the keep-alive message was received and by the central registration system 12 and the communication pathway between the radio system 48 and the central registration system 12 is properly operating. This may result in a positive determination in block 100. The predetermined time may be, for example, one minute, five minutes, ten minutes, fifteen minutes, or some other length of time.

Upon a positive determination in block 100, the logical flow may proceed to block 102 where normal communication operations in accordance with the spectrum certificate are carried out. The logical flow may return to block 92 for the transmission of the next keep-alive message at the appropriate time interval.

If a negative determination is made in bock 100, the logical flow may proceed to block 104 where remedial action is taken. For example, the radio system 48 may cease operation using the spectrum that is specified in the spectrum certificate. Operation may continue using alternate spectrum, if available to the radio system 48. In another embodiment, operation may continue using a predetermined portion of the spectrum, but the rest of the spectrum is relinquished for potential use by other systems (e.g., a newly activated priority system 46).

In one embodiment, the radio system 106 also may transmit a new registration request in block 106. Similar to blocks 62 through 68, the registration request of block 106 may be received by the central registration system 12 in block 108 and processed in block 110. Also in block 110, a new spectrum certificate may be transmitted to the radio system 48. The new spectrum certificate may be received and processed by the radio system 48 in block 112.

The process depicted by FIG. 5 is arranged to verify that the communication pathway between the radio system 48 and the central registration system 12 is capable of successfully delivering a revocation message to the radio system 48. If the process indicates that communication connection is lost or interrupted, the radio system 48 may cease operation and may not restart operation using spectrum specified by the spectrum certificate until the process of acquiring a new spectrum certificate is completed. It will be appreciated that the central registration system 12 may originate the keep-alive message and the radio system 48 may acknowledge the keep-alive message, thereby reversing the illustrated operations. If the radio system does not receive the keep-alive message when expected, the radio system 48 may cease use of at least some of the spectrum specified in the spectrum certificate and seek a new spectrum certificate.

In another embodiment, the radio may send a message the central registration system 12 at predetermined intervals. The message may be in the form of a keep-alive message including, for example, a ping. The central registration system 12 may be configured to respond to the message as long as the pinging radio system 48 is not an impacted radio system. If no response is received to the message, an assumption may be made that the spectrum certificate is no longer valid or the communication pathway between the radio system 48 and the central registration system 12 is not operational. In this case, the radio system 48 may be configured to cease use of at least some of the spectrum from the spectrum certificate and may seek a new spectrum certificate. In this embodiment, the central registration system 12 need not send a revocation message to each impacted radio system 48.

E. Conclusion

Various approaches to clearing spectrum in a timely manner for use by a priority system have been described. The spectrum to be cleared may be referred to as an "exclusion zone" or excluded spectrum. For whitespace spectrum, it is contemplated that, in most circumstances, the excluded spectrum may be cleared for use by the priority system within two or three minutes.

Although certain embodiments have been shown and described, it is understood that equivalents and modifications falling within the scope of the appended claims will occur to others who are skilled in the art upon the reading and understanding of this specification.

What is claimed is:

1. A spectrum management system for radio systems, comprising:
   an interface to communicate with the radio systems over a network; and
   a processor that executes a spectrum allocation function that is stored in a memory and, by execution of the spectrum allocation function, the spectrum management system is configured to:
      receive data indicating that a priority radio system having spectrum use rights that dominate spectrum use rights of secondary radio systems has a need for spectrum;
      determine one or more secondary radio systems that are impacted by the priority radio system due to location and spectrum use rights of the second radio systems that are determined to be in potential contention with operation of the priority radio system; and
      communicate with the impacted secondary radio systems to free spectrum from the impacted secondary radio systems for use by the priority radio system; and
   wherein the communication with the impacted secondary radio systems includes transmitting a revocation message to each of the impacted secondary radio systems, each revocation message revoking at least some of the spectrum use rights of the corresponding secondary radio system; and
   wherein the spectrum management system is further configured to determine if an acknowledgement is received from the secondary radio system in response to the revocation message within a predetermined amount of time from transmission of the revocation message.

2. The spectrum management system of claim 1, wherein the determination includes establishing an area of impact of the priority radio system and identifying secondary radio systems that are located in the area of impact.

3. The spectrum management system of claim 1, wherein the spectrum use rights of each secondary radio system is defined by a spectrum certificate corresponding to the secondary radio system.

4. The spectrum management system of claim 3, wherein the spectrum certificate contains a channel map identifying available channels from a plurality of predetermined channels.

5. The spectrum management system of claim 4, wherein the secondary radio systems are television whitespace band (TVBD) radios.

6. The spectrum management system of claim 3, wherein the spectrum certificate is generated as a result of matching spectrum needs of the secondary radio system with available spectrum from a spectrum holder.

7. The spectrum management system of claim 1, wherein the spectrum management system is further configured to receive a keep-alive message from each of the secondary radio systems and transmit an acknowledgement in response to each keep-alive message.

8. The spectrum management system of claim 1, wherein the acknowledgement is a request for a new spectrum certificate that contains an identification of available spectrum.

9. The spectrum management system of claim 1, wherein if the acknowledgement is not received in the predetermined amount of time, the spectrum management system plans spectrum use of the priority radio system around the secondary ratio system from which the acknowledgement is not received.

10. The spectrum management system of claim 1, wherein if the acknowledgement is not received in the predetermined amount of time, the spectrum management system plans alerts a user.

11. The spectrum management system of claim 10, wherein the user is prompted to manually turn off the second radio system from which the acknowledgement is not received.

12. A secondary radio system for wireless communications activity and that has spectrum use rights that are subservient to a priority radio system, comprising:
   a transceiver for engaging in the wireless communications activity;
   a controller for managing secondary radio system operation such that the secondary radio system is configured to:
      use spectrum specified by a spectrum certificate for the wireless communications and, during the spectrum use, communicate with a spectrum management system to monitor operational status of a communication pathway between the secondary radio system and the spectrum management system; and
   if an expected acknowledgement is not received within a Predetermined period of time, terminate use of at least some of the spectrum specified by the spectrum certificate.

13. The secondary radio system of claim 12, wherein the secondary radio system is further configured to receive a communication from the spectrum management system to coordinate freeing at least some of the spectrum specified by the spectrum certificate for use by a priority radio system and terminate use of the freed spectrum for use by the priority radio system.

14. The secondary radio system of claim 13, wherein the communication from the spectrum management system to free spectrum is a revocation message that revokes a right of the secondary radio system to use spectrum specified by the spectrum certificate.

15. The secondary radio system of claim 12, wherein the communication to monitor operational status of the communication pathway is a message transmitted by one of the secondary radio system or the spectrum management system and a corresponding acknowledgement transmitted by the other of the secondary radio system or the spectrum management system.

16. The secondary radio system of claim 15, wherein the message is sent by the secondary radio system and the secondary radio system is further configured to determine if an acknowledgement is received from the spectrum management system in response to the message within a predetermined amount of time from transmission of the message.

17. The secondary radio system of claim 12, wherein the spectrum certificate contains a channel map identifying available channels from a plurality of predetermined channels.

18. The secondary radio system of claim 17, wherein the secondary radio system is a television whitespace band (TVBD) radio.

19. The secondary radio system of claim 12, wherein the spectrum certificate is generated as a result of matching spectrum need of the secondary radio system with available spectrum from a spectrum holder.

20. The secondary radio system of claim 12, wherein the secondary radio system is further configured to request a new spectrum certificate if the expected message or acknowledgement is not received.

\* \* \* \* \*